United States Patent
Kohli et al.

(10) Patent No.: US 9,176,742 B2
(45) Date of Patent: Nov. 3, 2015

(54) CONVERTING DESKTOP APPLICATIONS TO WEB APPLICATIONS

(75) Inventors: Aseem Kohli, Mansfield, MA (US); Kristofer Hellick Reierson, Acton, MA (US); Angela Mele Anderson, Boston, MA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 395 days.

(21) Appl. No.: 12/978,672

(22) Filed: Dec. 27, 2010

(65) Prior Publication Data

US 2012/0166963 A1 Jun. 28, 2012

(51) Int. Cl.
*G06F 9/44* (2006.01)
*G06F 9/45* (2006.01)

(52) U.S. Cl.
CPC ... *G06F 9/44* (2013.01); *G06F 8/52* (2013.01)

(58) Field of Classification Search
CPC .......................................................... G06F 8/52
USPC ......................................................... 717/137
See application file for complete search history.

(56) References Cited

U.S. PATENT DOCUMENTS

| | | | |
|---|---|---|---|
| 6,763,370 B1 | 7/2004 | Schmeidler et al. | |
| 6,938,096 B1 | 8/2005 | Greschler et al. | |
| 7,017,188 B1 | 3/2006 | Schmeidler et al. | |
| 7,028,305 B2 | 4/2006 | Schaefer | |
| 7,194,729 B2 | 3/2007 | Stone et al. | |
| 7,200,632 B1 | 4/2007 | Greschler et al. | |
| 7,225,264 B2 * | 5/2007 | Croman et al. | 709/232 |
| 7,426,661 B2 | 9/2008 | Schaefer | |
| 7,451,451 B2 | 11/2008 | Schaefer | |
| 7,590,743 B2 | 9/2009 | Willis | |
| 7,690,039 B2 | 3/2010 | Schmeidler et al. | |
| 7,707,641 B2 | 4/2010 | Schmeidler et al. | |
| 7,730,169 B1 * | 6/2010 | Greschler et al. | 709/223 |
| 7,797,372 B2 | 9/2010 | Greschler et al. | |
| 8,312,422 B2 * | 11/2012 | Karatal et al. | 717/105 |
| 2003/0106041 A1 * | 6/2003 | Stone et al. | 717/108 |

(Continued)

FOREIGN PATENT DOCUMENTS

| | | |
|---|---|---|
| CN | 1447937 A | 10/2003 |
| CN | 1487446 A | 4/2004 |
| CN | 101208660 A | 6/2008 |

OTHER PUBLICATIONS

HTML5 History, Good tutorial for using HTML5 Hostory API (Pushstate?), Stackoverflow (Published Oct. 25, 2010) retrieved from http://stackoverflow.com/questions/4015613/good-tutorial-for-using-html5-history-api-pushstate on Jul. 29, 2013 ("HTML5 History").*

(Continued)

*Primary Examiner* — Don Wong
*Assistant Examiner* — Theodore Hebert
(74) *Attorney, Agent, or Firm* — Nicholas Chen; Kate Drakos; Micky Minhas

(57) ABSTRACT

Technologies are described herein for converting a desktop application to a web application. An interface file is generated based on a user interface of the desktop application. A logic file is generated based on application executables of the desktop application. A data model is generated based on application data and states of the desktop application. The web application is generated based on the interface file, the logic file, and the data model.

30 Claims, 5 Drawing Sheets

(56) References Cited

U.S. PATENT DOCUMENTS

| | | | | |
|---|---|---|---|---|
| 2004/0268228 | A1* | 12/2004 | Croney et al. | 715/505 |
| 2006/0059422 | A1 | 3/2006 | Wu et al. | |
| 2007/0162840 | A1* | 7/2007 | Rochelle et al. | 715/505 |
| 2008/0216052 | A1* | 9/2008 | Hejlsberg et al. | 717/114 |
| 2009/0228896 | A1* | 9/2009 | Meijer et al. | 719/313 |
| 2009/0248695 | A1* | 10/2009 | Ozzie et al. | 707/10 |
| 2009/0293054 | A1* | 11/2009 | Sheehan et al. | 718/1 |
| 2009/0313322 | A1* | 12/2009 | Sheehan et al. | 709/203 |
| 2010/0023738 | A1* | 1/2010 | Sheehan et al. | 713/1 |
| 2010/0205643 | A1 | 8/2010 | Raftelis et al. | |
| 2010/0287313 | A1* | 11/2010 | Reierson et al. | 710/10 |
| 2010/0313199 | A1* | 12/2010 | Chen et al. | 717/177 |
| 2012/0102103 | A1* | 4/2012 | Jacobson et al. | 709/204 |
| 2012/0166963 | A1* | 6/2012 | Kohli et al. | 715/744 |

OTHER PUBLICATIONS

HTML5 History, Good tutorial for using HTML5 Hostory API (Pushstate?), Stackoverflow (Published Oct. 25, 2010) retrieved from http://stackoverflow.com/questions/4015613/good-tutorial-for-using-html5-history-api-pushstate on Jul. 29, 2013.*

HTML5 History, Good tutorial for using HTML5 History API (Pushstate?), Stackoverflow (Published Oct. 25, 2010) retrieved from http://stackoverflow.com/questions/4015613/good-tutorial-for-using-html5-history-api-pushstate.*

Creamtec, Architectural White Paper, Creamtec LLC (Published Jan. 12, 2008), http://web.archive.org/web/20080112131710/http://www.creamtec.com/products/ajaxswing/doc/whitepaper.html on Jul. 28, 2013.*

Softwaremining, Business Rule Extraction from COBOL applications, The Softwaremining Company (2009) retrieved from http://www.softwaremining.com/download/pdf/SM-BRE-Brochure.pdf on Dec. 1, 2014.*

Wilson, JApplets and Standard Java Applications, (May 26, 2007) retrieved from http://www.dreamincode.net/forums/topic/28410-application-to-japplet-and-reverse/ on Apr. 21, 2014.*

HTML5 History, Good tutorial for using HTML5 History API (Pushstate?), Stackoverflow (Published Oct. 25, 2010) retrieved from http://stackoverflow.com/questions/4015613/good-tutorial-for-using-html5-history-api-pushstate on Jul. 29, 2013.*

"International Search Report", Mailed Date: Aug. 29, 2012, Application No. PCT/US2011/066804, Filed Date: Dec. 22, 2011, pp. 9.

George, et al., "Programming Language Inter-conversion", International Journal of Computer Applications (0975-8887), 2010, vol. 1, No. 20, pp. 63-69.

Puder, Arno, "Extending Desktop Applications to the Web", Retrieved at <<http://citeseerx.ist.psu.edu/viewdoc/download?doi=10.1.1.99.7943&rep=rep1&type=pdf>>, 2004, pp. 6.

"Automatically Convert Java Desktop Application to Web Application", Retrieved at <<http://www.creamtec.com/products/ajaxswing/solutions/convert_desktop_to_web.html>>, 2010, p. 1.

Ghrist, John, "Technology Focus: Facing the Strain: Web-Enablement Tools for System i", Retrieved at <<http://www.mcpressonline.com/programming/dev-tools/technology-focus-facing-the-strain-web-enablement-tools-for-system-i.html>>, Jul. 19, 2010, pp. 5.

Staiger, Stefan, "Static Analysis of Programs with Graphical User Interface", Retrieved at <<http://ieeexplore.ieee.org/stamp/stamp.jsp?tp=&arnumber=4145043>>, 11th European Conference on Software Maintenance and Re engineering, Mar. 2007, pp. 10.

"Ext Designer, HTML5 Prototyping Tool for Web Apps", Retrieved at <<http://www.sencha.com/company/archive/2010/05/18/ext-designer-hits-75000-installations.php>>, May 18, 2010, pp. 2.

Beecher, Fred, "A Detailed Look at HTML5 for UX Designers", Retrieved at <<http://userexperience.evantageconsulting.com/2010/08/detailed-html5-ux-designers/>>, Aug. 9, 2010, pp. 7.

Zhang, et al., "Converting Legacy Desktop Applications into On-Demand Personalized Software", Retrieved at <<http://ieeexplore.ieee.org/stamp/stamp.jsp?tp=&arnumber=5487491>>, Services Computing, IEEE Transactions, No. 99, Jun. 17, 2010, pp. 14.

Douceur, et al., "Leveraging Legacy Code to Deploy Desktop Applications on the Web", Retrieved at <<http://research.microsoft.com/en-us/um/people/howell/papers/xax-osdi08-final.pdf>>, 2008, pp. 16.

"First Office Action and Search Report Issued in Chinese Patent Application No. 201110441919.0", Mailed Date: Mar. 31, 2014, 14 pages.

"Second Office Action Issued in Chinese Patent Application No. 201110441919.0", Mailed Date: Nov. 15, 2014, 9 Pages.

"Third Office Action Issued in Chinese Patent Application No. 201110441919.0", Mailed Date: Mar. 9, 2015, 10 Pages.

* cited by examiner

CONVERTING DESKTOP APPLICATIONS TO WEB APPLICATIONS

BACKGROUND

Business applications have traditionally been offered as desktop applications. Desktop applications, which are typically installed on individual client machines, generally provide a rich, responsive, and available interface that includes a wide range of user interface ("UI") controls and other design elements. Also, because business applications have traditionally been offered as desktop applications, the development of desktop applications is generally known. However, some drawbacks of desktop applications include operating system ("OS") dependence, security vulnerability, and maintenance difficulty.

Regarding OS dependence, a desktop application designed for one operating system may not execute on another operation. Sometimes a desktop application designed for one version of an operating system may not even run on another version of the same operating system. Regarding security vulnerability, multiple desktop applications running on the same computer and operating system may suffer from various application conflicts, such as namespace conflicts or dependency conflicts between software components. Regarding maintenance difficulty, deploying and updating each instance of the same desktop application on multiple client machines can be tedious and time-consuming, especially for large enterprises with a substantial collection of client machines.

In contrast to desktop applications, World Wide Web ("web") applications are OS-independent. Most web applications operate on any standard web browser connected to the Internet, irrespective of the underlying operating system. Further, because web applications run in the web browser, application conflicts like namespace conflicts and dependency conflicts can be avoided. Additionally, a web application which runs in the cloud can be deployed and updated in a single instance where the web application is hosted.

The process of converting existing desktop applications into web applications usually involves a complete rewrite of the desktop application. This can be incredibly cost prohibitive and error prone. Further, some conventional web interfaces (e.g., HTML4 or earlier) do not provide adequate functionality for providing the same rich interface that the desktop application can. As a result, existing web versions of desktop applications typically provide reduced functionality in a simpler interface when compared to the installed desktop applications.

It is with respect to these and other considerations that the disclosure made herein is presented.

SUMMARY

Technologies are described herein for converting a desktop application to a web application. An example format of the web application is HyperText Markup Language Revision 5 ("HTML5"). Through the utilization of the technologies and concepts presented herein, a conversion process accepts as input a desktop application and outputs a converted web application, which provides a similar functionality and user experience as the desktop application. The desktop application may include a user interface, application executables, and application data and states. The resulting web application may include a web interface, a page router, n-tier business logic, and web data stores.

The conversion process deconstructs interface components from a user interface of the desktop application. Through the deconstructed interface components, the conversion process can generate the web interface. The conversion process also deconstructs, from the application executables, business logic and mappings between the business logic and various states of the user interface. Through the deconstructed business logic and the mappings, the conversion process can generate the page router and the n-tier business logic. The conversion process further deconstructs variable types for data that is stored and retrieved by the desktop application and user states that persist across multiple sessions of the desktop application from the application data and states. Through the deconstructed variable types and user states, the conversion process can allocate the web data stores.

In some example technologies, a computer having a memory and a processor is configured to convert a desktop application to a web application. The computer generates an interface file based on a user interface of a desktop application. The computer also generates a logic file based on application executables of the desktop application. The computer further generates a data model based on application data and states of the desktop application. The computer then generates the web application based on the interface file, the logic file and the data model.

It should be appreciated that the above-described subject matter may also be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

The following detailed description is directed to technologies for converting a desktop application to a web application. In accordance with some embodiments described herein, a conversion process is adapted to convert a desktop application to a web application. The conversion process may deconstruct the desktop application from a user interface, application executables, and application data and states into metadata representing the user interface, the application executables, and the application data and states. Upon deconstructing the desktop application into the relevant metadata, the conversion process may generate a resulting web application based on the deconstructed metadata. The web application may include a web interface, a page router, n-tier web business logic, and web data stores.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Figure 1:
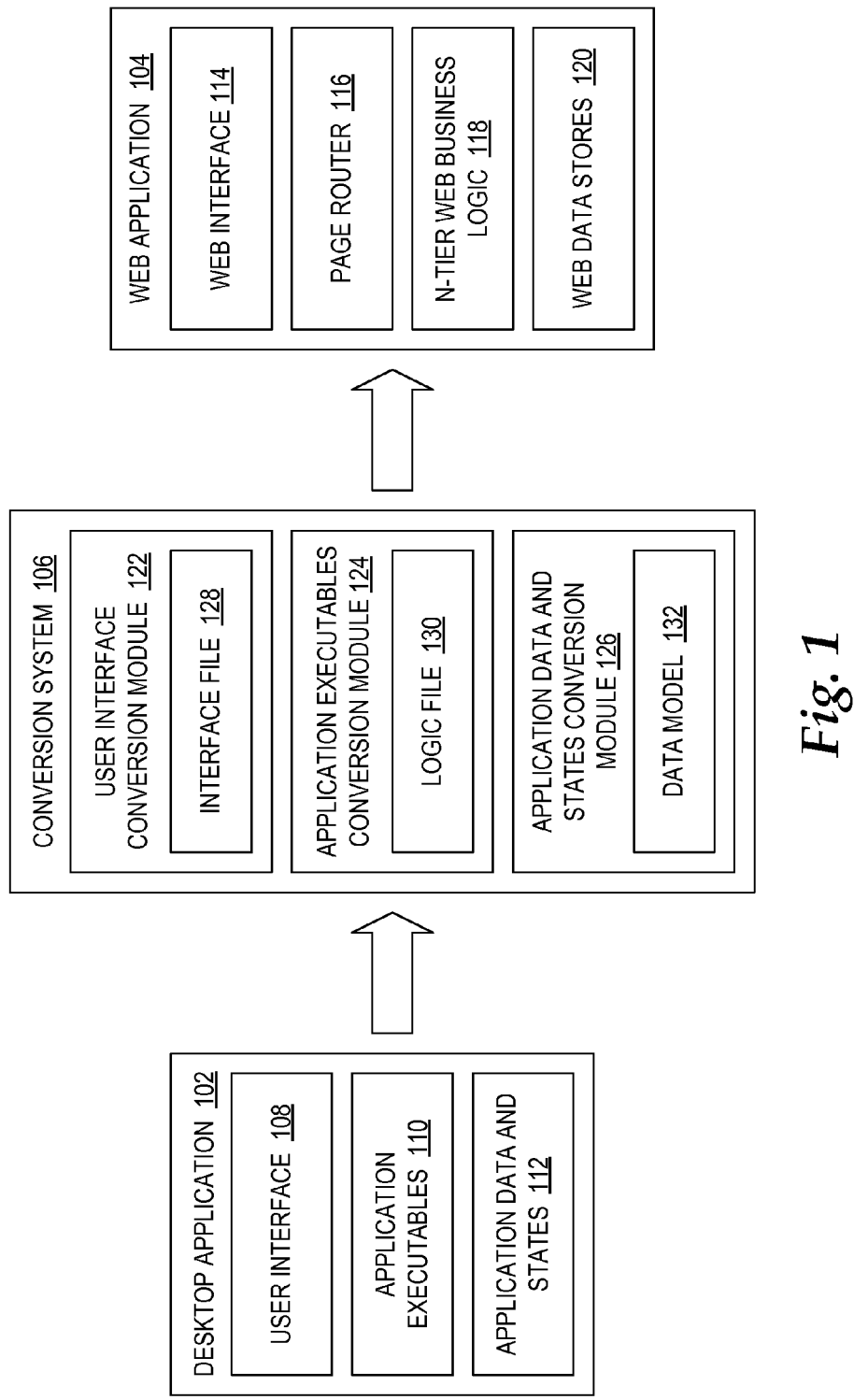
FIG. 1 is a block diagram illustrating a conversion system architecture for converting a desktop application to a web application, in accordance with some embodiments.

In the following detailed description, references are made to the accompanying drawings that form a part hereof, and which are shown by way of illustration, specific embodiments, or examples. Referring now to the drawings, in which like numerals represent like elements through the several figures, a computing system and methodology for converting a desktop application into a web application will be described. In particular, FIG. 1 illustrates a conversion system architecture 100 for converting a desktop application 102 to a web application 104, in accordance with some embodiments. The conversion system architecture 100 may include a conversion system 106, which is configured to accept as input the desktop application 102 and to output the converted web application 104 based on the desktop application 102.

The desktop application 102 may include a user interface 108, application executables 110, and application data and states 112. The web application 104 may include a web interface 114, a page router 116, n-tier web business logic 118, and web data stores 120. The conversion system 106 may include a user interface conversion module 122, an application executables conversion module 124, and an application data and states conversion module 126.

The user interface conversion module 122 may be configured to deconstruct the user interface 108 into an interface file 128. The interface file 128 may be an Extensible Markup Language ("XML") file or other suitable file format. The interface file 128 may include a specification of interface components corresponding to the "look and feel" of the user interface 108. For example, the interface file 128 may specify the presence, location, and/or size of graphical user interface ("GUI") elements within the user interface 108. Some examples of GUI elements may include windows, menus, icons, and controls.

Upon deconstructing the user interface 108 into the interface file 128, the user interface conversion module 122 may further be configured to generate the web interface 114 based on the interface file 128. The interface file 128 may provide a standard representation of the user interface 108 regardless of the underlying application framework of the interface file 128. In this way, the user interface conversion module 122 can effectively generate the web interface 114 whether the underlying application framework of the user interface 108 is DIRECTX, MICROSOFT FOUNDATION CLASSES ("MFC"), or the like.

The web interface 114 may include multiple web pages, each of which corresponds to a particular visual state of the user interface 108. Each of the web pages may correspond to a particular uniform resource locator ("URL"). The web interface 114 may include any suitable web application code capable of mimicking the user interface 108 according to the interface file 128. For example, the web interface 114 may include code corresponding to HTML5, Cascading Style Sheets ("CSS"), SILVERLIGHT, JAVASCRIPT, FLASH, and/or the like. The operation of the user interface conversion module 122 will be described in greater detail below with reference to FIG. 2.

The application executables conversion module 124 may be configured to deconstruct the application executables 110 into a logic file 130. The application executables 110 may include various executable files containing instructions that cause a computer to perform certain tasks, thereby providing functionality of the desktop application 102. The application executables 110 may also utilize various libraries (e.g., dynamic linked libraries) containing various subroutines and/or classes, as well as other suitable files. The logic file 130 may be an XML file or other suitable file format. The logic file 130 may include a specification of the business logic of the desktop application 102. The logic file 130 may also map the business logic to various states of the user interface 108. For example, the logic file 130 may specify that when a certain interface button on the user interface 108 is selected, a corresponding calculation is performed and/or the user interface 108 transitions from one visual presentation to another visual presentation.

Upon deconstructing the application executables 110 into the logic file 130, the application executables conversion module 124 may further be configured to generate the page router 116 and the n-tier web business logic 118 based on the logic file 130. The page router 116 may map URLs of web pages contained in the web interface 114 to particular business logic defined by the n-tier web business logic 118. The n-tier web business logic 118 may include multiple tiers separating business logic across multiple concerns. For example, one tier of business logic may control the web interface 114 (e.g., transitions between web pages depending on the selection of particular GUI elements), while another tier of business logic may control data processing.

The logic file 130 may provide a standard representation of the application executables 110. The logic file 130 may include any suitable web business logic code capable of representing the business logic underlying the application executables 110. For example, the logic file 130 may include .NET FRAMEWORK code that represents the business logic. From the intermediary .NET FRAMEWORK code, the application executables conversion module 124 can then generate the page router 116 and the n-tier web business logic 118 based on the .NET FRAMEWORK code. The page router 116 and the n-tier web business logic 118 may be embodied in any suitable web application framework, such as ASP.NET, JAVA, C++, and/or the like. The operation of the application executables conversion module 124 will be described in greater detail below with reference to FIG. 3.

The application data and states conversion module 126 may be configured to deconstruct the application data and states 112 into a data model 132. The application data and states 112 may include the data that is stored and retrieved by the desktop application 102. In the desktop application 102, data is typically stored and retrieved from local storage, such as a hard drive. However, in the web application 104, local storage may not be available, so data is typically stored and retrieved from a remote database over a communications network, such as the Internet. Accordingly, the data model 132 may specify the variable types (e.g., integer, float, string, etc.) for the data that is stored and retrieved by the desktop application 102. In this way, the application data and states conversion module 126 can allocate the web data stores 120 in a suitable database, such that the web application 104 can store data to and retrieve data from the web data stores 120.

The application data and states 112 may further include user states. The user states may include user configuration settings that persist across multiple sessions of the desktop application 102. For example, the user states may specify the location of a toolbar in the user interface 108 and the collection of icons within the toolbar. Accordingly, the data model 132 may further specify user states for the web application 104 that can be persisted across multiple sessions of the desktop application 102. In this way, the application data and states conversion module 126 can allocate the web data stores 120 in a suitable database, such that the web application 104 can store user configuration settings to and retrieve user configuration settings from the web data stores 120. The operation of the application data and states conversion module 126 will be described in greater detail below with reference to FIG. 4.

Figure 2:
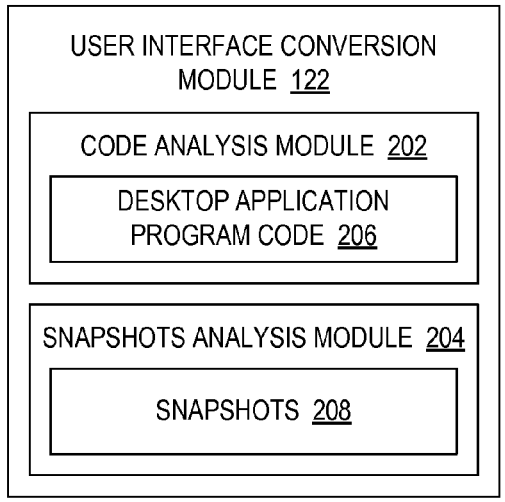
FIG. 2 is a block diagram illustrating a user interface conversion module for generating an interface file, in accordance with some embodiments.

Referring now to FIG. 2, additional details regarding the operation of the user interface conversion module 122 will be described. The user interface conversion module 122 may include a code analysis module 202 and/or a snapshots analysis module 204. In some embodiments, users can manually enter interface components that make up the user interface 108 into the interface file 128. In some other embodiments, users can utilize the code analysis module 202 and/or the snapshots analysis module 204, as described below, in order to determine interface components that make up the user interface 108 in an automated manner.

The code analysis module 202 may be configured to analyze program code 206 associated with the user interface 108 in order to determine interface components that make up the user interface 108. The program code 206 may be a high-level programming language representation, an assembly language representation, or a machine language representation of the desktop application 102. For example, the code analysis module 202 may identify the presence, location, and/or size of various GUI elements within the user interface 108. The code analysis module 202 may then generate the interface file 128 that specifies the interface components. The code analysis module 202 may also generate the web interface 114 based on the interface file 128.

The snapshots analysis module 204 may be configured to analyze snapshots 208 of the user interface 108. The snapshots 208 may include multiple screen captures of the user interface 108 in various visual states. For example, during execution of the desktop application 102, a snapshot tool (not shown) may take the snapshots 208. The snapshots analysis module 204 may perform suitable image analysis of the snapshots 208 in order to determine interface components that make up the user interface 108. For example, the snapshots analysis module 204 may identify the presence, location, and/or size of various GUI elements within the user interface 108. The snapshots analysis module 204 may then generate the interface file 128 that specifies the interface components. The snapshots analysis module 204 may also generate the web interface 114 based on the interface file 128. In some embodiments, the code analysis module 202 and the snapshots analysis module 204 may be utilized in conjunction in order to generate and/or validate the contents of the interface file 128.

Figure 3:
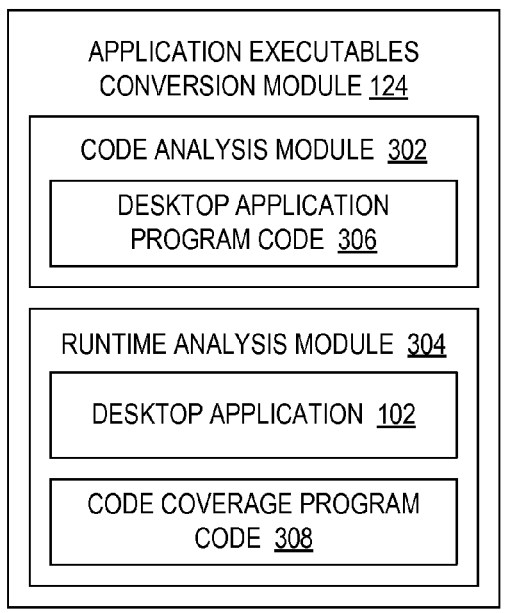
FIG. 3 is a block diagram illustrating an application executables conversion module for generating a logic file, in accordance with some embodiments.

Referring now to FIG. 3, additional details regarding the operation of the application executables conversion module 124 will be described. The application executables conversion module 124 may include a code analysis module 302 and/or a runtime analysis module 304. The code analysis module 302 may be configured to analyze the program code 306 associated with the application executables 110 in order to extract business logic and mappings between the business logic and various states of the user interface 108 from the application executables 110. The code analysis module 302 may then generate the logic file 130 that specifies the business logic and the mappings between the business logic and various states of the user interface 108. The code analysis module 302 may also generate the page router 116 and the n-tier web business logic 118 based on the logic file 130.

The runtime analysis module 304 may be configured to execute the desktop application 102, through suitable computing device, in order to effectuate runtime processes of the desktop application 102. The runtime analysis module 304 may then analyze the runtime processes performed by the computing device. Through analyzing the runtime processes of the computing device, the runtime analysis module 304 can extract business logic from the application executables 110 and mappings between the business logic and various states of the user interface 108. The application executables conversion module 124 may then generate the logic file 130 that specifies the business logic and the mappings between the business logic and various states of the user interface 108. The runtime analysis module 304 may also generate the page router 116 and the n-tier web business logic 118 based on the logic file 130. In some embodiments, the code analysis module 302 and the runtime analysis module 304 may be utilized in conjunction in order to generate and/or validate the contents of the logic file 130.

In some embodiments, the runtime analysis module 304 may further be configured to verify code coverage during the execution of the desktop application 102. For example, the runtime analysis module 304 may insert into the desktop application 102 additional program code 308 that is configured to monitor whether at least relevant portions of code have been traversed (also referred to as code coverage) during the execution of the desktop application 102. The runtime analysis module 304 may output a percentage indicating the code coverage of the desktop application 102. In this way, if a user is not satisfied with the code coverage, the user can continue executing the desktop application 102 until adequate code coverage has been realized. When adequate code coverage has been realized, the user can terminate execution of the desktop application 102.

Figure 4:
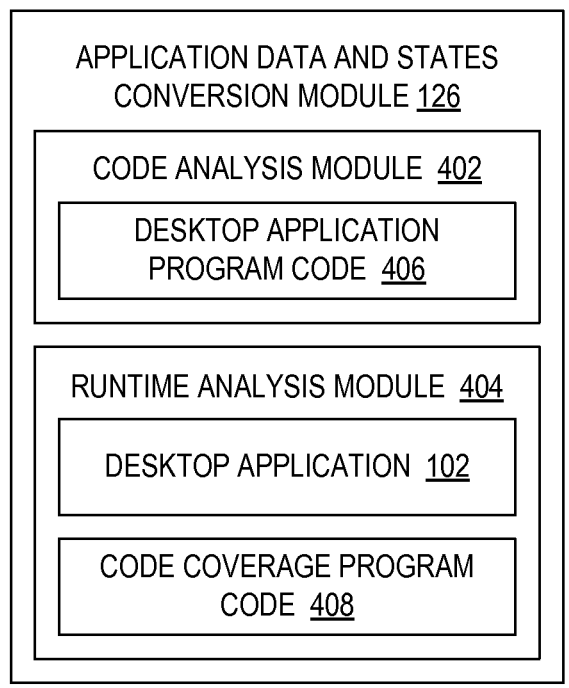
FIG. 4 is a block diagram illustrating an application data and states conversion module for generating a data model, in accordance with some embodiments.

Referring now to FIG. 4, additional details regarding the operation of the application data and states conversion module 126 will be described. The application data and states conversion module 126 may include a code analysis module 302 and/or a runtime analysis module 304. In some embodiments, users can manually enter the variable types for the data that is stored and retrieved by the desktop application 102 into the data model 132. Users can also manually enter the user states that persist across multiple sessions into the data model 132. In some other embodiments, users can utilize the code analysis module 402 and/or the runtime analysis module 404, as described below, in order to determine the variable types for the data that is stored and retrieved by the desktop application 102 and the user states that persist across multiple sessions of the desktop application 102 in an automated manner.

The code analysis module 402 may be configured to analyze the program code 406 associated with the application data and states 112 in order to determine the variable types for the data that is stored and retrieved by the desktop application 102 and the user states that persist across multiple sessions of the desktop application 102. The code analysis module 402 may then generate the data model 132 that specifies the variable types for the data that is stored and retrieved by the desktop application 102 and the user states that persist across multiple sessions of the desktop application 102. The code analysis module 302 may also allocate the web data stores 120 having a database structure based on the data model 132.

The runtime analysis module 404 may be configured to execute the desktop application 102, through a suitable computing device, in order to analyze the creation, storage, and/or retrieval of data during execution of the desktop application 102. Through an analysis of the creation, storage, and/or retrieval of data during execution of the desktop application 102, the runtime analysis module 404 can determine the variable types for the data that is stored and retrieved by the desktop application 102. The runtime analysis module 404 may also be configured to analyze WINDOWS registry data, configuration files, and other suitable configuration data that store user states with respect to the desktop application 102. Through an analysis of the WINDOWS registry data and/or configuration files, the runtime analysis module 404 can determine the user states that persist across multiple sessions of the desktop application 102. The runtime analysis module 404 may then generate the data model 132 that specifies the variable types for the data that is stored and retrieved by the desktop application 102 and the user states that persist across multiple sessions of the desktop application 102. The runtime analysis module 404 may also allocate the web data stores 120 having a database structure based on the data model 132. In some embodiments, the code analysis module 302 and the runtime analysis module 304 may be utilized in conjunction in order to generate and/or validate the contents of the data model 132.

In some embodiments, the runtime analysis module 404 may further be configured to verify code coverage during the execution of the desktop application 102. For example, the runtime analysis module 404 may insert into the desktop application 102 additional program code 408 that is configured to monitor whether at least relevant portions of code have been traversed during the execution of the desktop application 102. The runtime analysis module 404 may output a percentage indicating the code coverage of the desktop application 102. In this way, if a user is not satisfied with the code coverage, the user can continue executing the desktop application 102 until adequate code coverage has been realized. When adequate code coverage has been realized, the user can terminate execution of the desktop application 102.

In some embodiments, the runtime analysis module 404 and/or the runtime analysis module 304 may further be configured to verify associations between the logic file 130 and the data model 132. In particular, the runtime analysis module 404 and/or the runtime analysis module 304 may verify that each variable specified in the data model 132 corresponds to particular business logic in the logic file 130. If some variable specified in the data model 132 does not correspond to some business logic in the logic file 130, then the runtime analysis module 404 and/or the runtime analysis module 304 may notify a user of an error.

Figure 5:
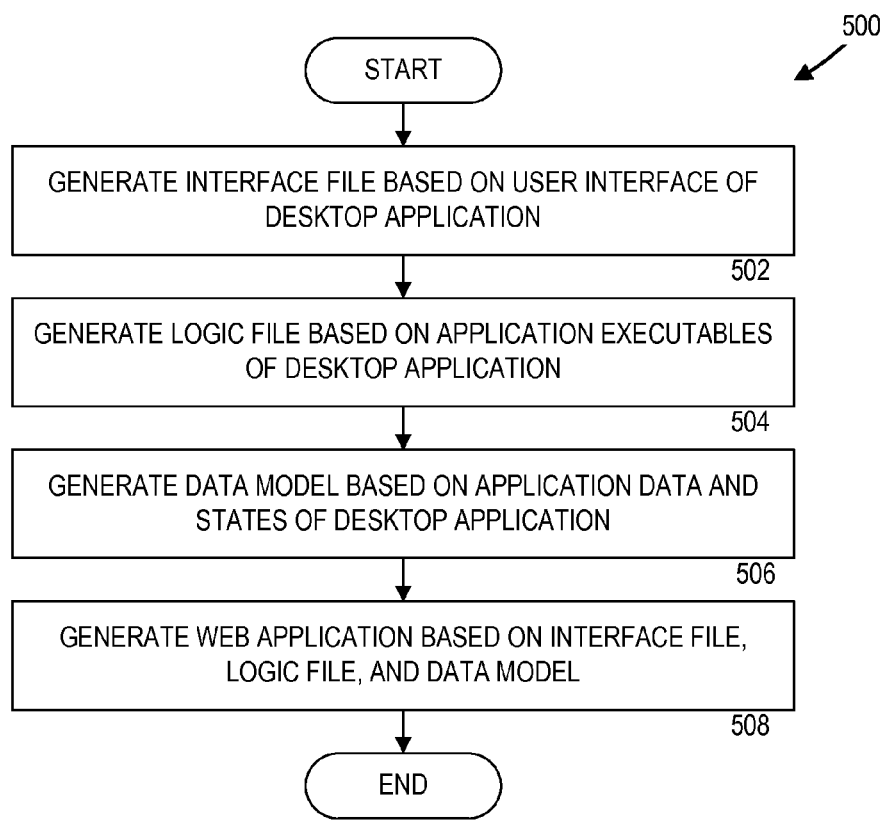
FIG. 5 is a flow diagram illustrating a method for converting a desktop application to a web application, in accordance with some embodiments.

Referring now to FIG. 5, additional details regarding the operation of the conversion system 106. In particular, FIG. 5 is a flow diagram illustrating a method for converting a desktop application to a web application, in accordance with some embodiments. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states operations, structural devices, acts, or modules. These operations, structural devices, acts, and modules may be implemented in software, in firmware, in special purpose digital logic, and any combination thereof. It should be appreciated that more or fewer operations may be performed than shown in the figures and described herein. These operations may also be performed in a different order than those described herein.

In FIG. 5, a routine 500 begins at operation 502, where the conversion system 106 generates the interface file 128 based on the user interface 108 of the desktop application 102. In some embodiments, the conversion system 106 may utilize the code analysis module 202 to analyze the program code 206 associated with the user interface 108 in order to determine interface components that make up the user interface 108. In some other embodiments, the conversion system 106 may also utilize the snapshots analysis module 204 to analyze snapshots 208 of the user interface 108 to determine interface components that make up the user interface 108.

In yet other embodiments, the conversion system 106 may utilize a combination of the code analysis module 202 and the snapshots analysis module 204. When the conversion system 106 determines the interface components that make up the user interface 108, the conversion system 106 may then generate the interface file 128 specifying the interface components. When the conversion system 106 generates the interface file 128 based on the user interface 108 of the desktop application 102, the routine 500 proceeds to operation 504.

At operation 504, the conversion system 106 generates the logic file 130 based on the application executables 110 of the desktop application 102. In some embodiments, the conversion system 106 may utilize the code analysis module 302. The code analysis module 302 may analyze the program code 306 associated with the application executables 110 in order to extract business logic and mappings between the business logic and various states of the user interface 108 from the application executables 110. In some other embodiments, the conversion system 106 may utilize the runtime analysis module 304. The runtime analysis module 304 may execute the desktop application 102, through a suitable computing device, in order to effectuate runtime processes of the desktop application 102. The runtime analysis module 304 may then analyze the runtime processes in order to extract business logic from the application executables 110 and mappings between the business logic and various states of the user interface 108.

In yet other embodiments, the conversion system 106 may utilize a combination of the code analysis module 302 and the runtime analysis module 304. When the conversion system 106 extracts the relevant logic information, the conversion system 106 may then generate the logic file 130 specifying the business logic from the application executables 110 and the mappings between the business logic and various states of the user interface 108. When the conversion system 106 generates the logic file 130 based on the application executables 110 of the desktop application 102, the routine 500 proceeds to operation 506.

At operation 504, the conversion system 106 generates the data model 132 based on the user interface 108 of the desktop application 102. In some embodiments, the conversion system 106 may utilize the code analysis module 402. The code analysis module 402 may analyze the program code 406 associated with the application data and states 112 in order to determine the variable types for the data that is stored and retrieved by the desktop application 102 and the user states that persist across multiple sessions of the desktop application 102. In some other embodiments, the conversion system 106 may utilize the runtime analysis module 404. The runtime analysis module 404 may analyze the creation, storage, and/or retrieval of data during execution of the desktop application 102 in order to determine the variable types for the data that is stored and retrieved by the desktop application 102. The runtime analysis module 404 may also analyze configuration data in order to determine the user states that persist across multiple sessions of the desktop application 102.

In yet other embodiments, the conversion system 106 may utilize a combination of the code analysis module 402 and the runtime analysis module 404. When the conversion system 106 determines the variable types for the data that is stored and retrieved by the desktop application 102 and the user states that persist across multiple sessions of the desktop application 102, the conversion system 106 may then generate the data model 132 that specifies the variable types and the user states. When the conversion system 106 generates the data model 132 based on the application data and states 112 of the desktop application 102, the routine 500 proceeds to operation 508.

At operation 508, the conversion system 106 may generate the web application 104 based on the interface file 128, the logic file 130, and the data model 132. The user interface conversion module 122 may generate the web interface 114 based on the interface file 128. The application executables conversion module 124 may generate the page router 116 and the n-tier web business logic 118 based on the logic file 130. The application data and states conversion module 126 may allocate the web data stores 120 based on the data model 132. When the conversion system 106 generates the web application 104 based on the interface file 128, the logic file 130, and the data model 132, the routine 500 may either repeat (e.g., periodically, continuously, or on demand as needed) or terminate.

Figure 6:
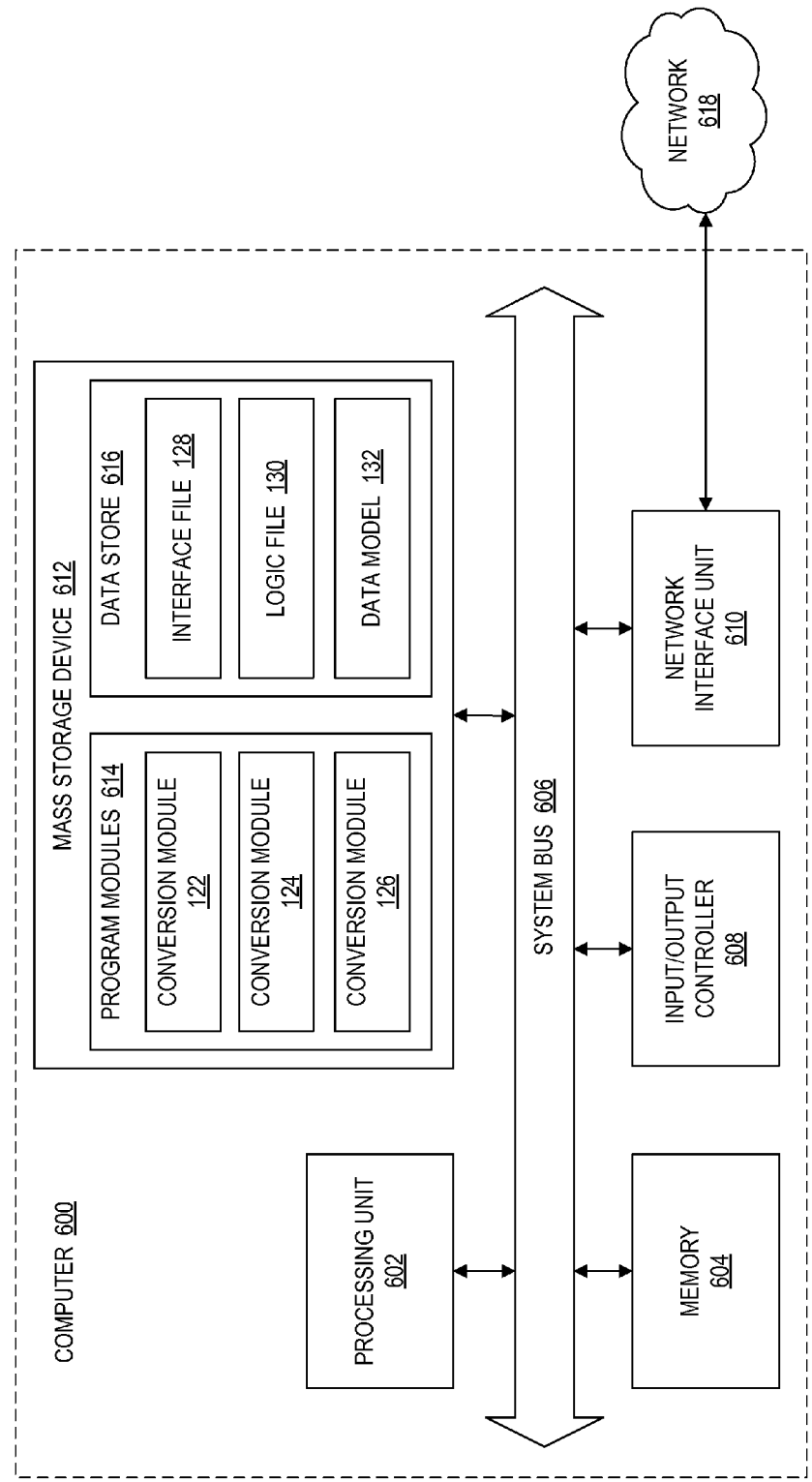
FIG. 6 is a computer architecture diagram showing an illustrative computer hardware architecture for a computing system capable of implementing the embodiments presented herein.

Turning now to FIG. 6, an example computer architecture diagram showing a computer 600 is illustrated. Examples of the computer 600 may include the conversion system 106. The computer 600 may include a central processing unit 602, a system memory 604, and a system bus 606 that couples the memory 604 to the 602. The computer 600 may further include a mass storage device 612 for storing one or more program modules 614 and a data store 616. Examples of the program modules 614 may include the user interface conversion module 122, the application executables conversion module 124, and the application data and states conversion module 126. The data store 616 may store the interface file 128, the logic file 130, and the data model 132. The mass storage device 612 may be connected to the processing unit 602 through a mass storage controller (not shown) connected to the bus 606. The mass storage device 612 and its associated computer-storage media may provide non-volatile storage for the computer 600. Although the description of computer-storage media contained herein refers to a mass storage device, such as a hard disk or CD-ROM drive, it should be appreciated by those skilled in the art that computer-storage media can be any available computer storage media that can be accessed by the computer 600.

By way of example, and not limitation, computer-storage media may include volatile and non-volatile, removable and non-removable media implemented in any method or technology for the non-transitory storage of information such as computer-storage instructions, data structures, program modules, or other data. For example, computer-storage media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer 600.

According to various embodiments, the computer 600 may operate in a networked environment using logical connections to remote computers through a network 618. The computer 600 may connect to the network 618 through a network interface unit 610 connected to the bus 606. It should be appreciated that the network interface unit 610 may also be utilized to connect to other types of networks and remote computer systems. The computer 600 may also include an input/output controller 608 for receiving and processing input from a number of input devices (not shown), including a keyboard, a mouse, a microphone, and a game controller. Similarly, the input/output controller 608 may provide output to a display or other type of output device (not shown).

The bus 606 may enable the processing unit 602 to read code and/or data to/from the mass storage device 612 or other computer-storage media. The computer-storage media may represent apparatus in the form of storage elements that are implemented using any suitable technology, including but not limited to semiconductors, magnetic materials, optics, or the like. The computer-storage media may represent memory components, whether characterized as RAM, ROM, flash, or other types of technology. The computer-storage media may also represent secondary storage, whether implemented as hard drives or otherwise. Hard drive implementations may be characterized as solid state, or may include rotating media storing magnetically-encoded information.

The program modules 614 may include software instructions that, when loaded into the processing unit 602 and executed, cause the computer 600 to convert a desktop application to a web application. The program modules 614 may also provide various tools or techniques by which the computer 600 may participate within the overall systems or operating environments using the components, flows, and data structures discussed throughout this description. For example, the program modules 614 may implement interfaces for converting a desktop application to a web application.

In general, the program modules 614 may, when loaded into the processing unit 602 and executed, transform the processing unit 602 and the overall computer 600 from a general-purpose computing system into a special-purpose computing system customized to convert a desktop application to a web application. The processing unit 602 may be constructed from any number of transistors or other discrete circuit elements, which may individually or collectively assume any number of states. More specifically, the processing unit 602 may operate as a finite-state machine, in response to executable instructions contained within the program modules 614. These computer-executable instructions may transform the processing unit 602 by specifying how the processing unit 602 transitions between states, thereby transforming the transistors or other discrete hardware elements constituting the processing unit 602.

Encoding the program modules 614 may also transform the physical structure of the computer-storage media. The specific transformation of physical structure may depend on various factors, in different implementations of this description. Examples of such factors may include, but are not limited to: the technology used to implement the computer-storage media, whether the computer-storage media are characterized as primary or secondary storage, and the like. For example, if the computer-storage media are implemented as semiconductor-based memory, the program modules 614 may transform the physical state of the semiconductor memory, when the software is encoded therein. For example, the program modules 614 may transform the state of transistors, capacitors, or other discrete circuit elements constituting the semiconductor memory.

As another example, the computer-storage media may be implemented using magnetic or optical technology. In such implementations, the program modules 614 may transform the physical state of magnetic or optical media, when the software is encoded therein. These transformations may include altering the magnetic characteristics of particular locations within given magnetic media. These transformations may also include altering the physical features or characteristics of particular locations within given optical media, to change the optical characteristics of those locations. Other transformations of physical media are possible without departing from the scope of the present description, with the foregoing examples provided only to facilitate this discussion.

Based on the foregoing, it should be appreciated that technologies for converting a desktop application to a web application are presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A computer-implemented method for converting a desktop application to a web application, the method comprising computer-implemented operations for:

receiving, by a computer having a processor and a memory, the desktop application as input;

deconstructing, by the computer, a user interface of the desktop application to determine interface components that make up the user interface of the desktop application;

generating, by the computer, a web interface from the determined interface components that make up the user interface of the desktop application;

extracting, by the computer, business logic from application executables of the desktop application;

generating, by the computer, a logic file from the extracted business logic, the logic file comprising specification of the extracted business logic;

generating, by the computer, a data model from application data and states of the desktop application;

determining, by the computer, whether one or more variables specified in the data model corresponds to business logic in the logic file;

in response to determining that at least one variable specified in the data model does not correspond to the business logic in the logic file, outputting, by the computer, an error message;

generating, by the computer, the web application from the logic file and the data model, the web application including the web interface and not including the desktop application; and outputting the web application.

2. The computer-implemented method of claim 1, wherein generating the web interface comprises:

generating, by the computer, an interface file specifying the web interface based on the determined interface components.

3. The computer-implemented method of claim 2, wherein the determined interface components comprises a presence, location, or size of graphical user interface elements in the user interface.

4. The computer-implemented method of claim 1, wherein generating the web interface comprises:

receiving, by the computer, snapshots of the user interface, the snapshots comprising screen captures of the user interface in various states;

analyzing, by the computer, the snapshots to determine interface elements in the user interface; and generating, by the computer, an interface file specifying the interface elements.

5. The computer-implemented method of claim 1, wherein generating a logic file based on application executables of the desktop application comprises:

receiving, by the computer, program code associated with the desktop application;

analyzing, by the computer, the program code to extract the business logic and various states of the user interface; and generating, by the computer, the logic file specifying the business logic and the mappings between the business logic and various states of the user interface.

6. The computer-implemented of claim 5, wherein the program code comprises a high-level language representation, an assembly language representation, or a machine language representation of the desktop application.

7. The computer-implemented method of claim 1, wherein generating a logic file based on application executables of the desktop application comprises:

executing, by the computer, the desktop application to effectuate runtime processes of the desktop application;

analyzing, by the computer, the runtime processes during the execution of the desktop application to extract mappings between the business logic and various states of the user interface; and generating, by the computer, the logic file specifying the business logic and the mappings between the business logic and various states of the user interface.

8. The computer-implemented method of claim 7, further comprising computer-implemented operations for:

verifying, by the computer, code coverage during the execution of the desktop application; and terminating, by the computer, the execution of the desktop application when the code coverage reaches a minimum code coverage threshold.

9. The computer-implemented method of claim 1, wherein generating a data model based on application data and states of the desktop application comprises:
receiving, by the computer, program code associated with the desktop application;
analyzing, by the computer, the program code to determine variable types for data that is stored and retrieved by the desktop application and user states that persist across multiple sessions of the desktop application; and
generating, by the computer, the data model specifying the variable types for data that is stored and retrieved by the desktop application and the user states that persist across multiple sessions of the desktop application.

10. The computer-implemented method of claim 1, wherein generating a data model based on application data and states of the desktop application comprises:
executing, by the computer, the desktop application to effectuate runtime processes of the desktop application;
analyzing, by the computer, the runtime processes during the execution of the desktop application to determine variable types for data that is stored and retrieved by the desktop application and user states that persist across multiple sessions of the desktop application; and
generating, by the computer, the data model specifying the variable types for data that is stored and retrieved by the desktop application and the user states that persist across multiple sessions of the desktop application.

11. The computer-implemented method of claim 10, wherein generating the web application further comprises:
allocating, by the computer, web data stores having a database structure based on the data model.

12. A computer-implemented method for converting a desktop application to a web application, the method comprising computer-implemented operations for:
generating, by a computer having a processor and a memory, an interface file based on a user interface of the desktop application;
generating, by the computer, a logic file based on application executables of the desktop application;
generating, by the computer, a data model based on application data and states of the desktop application;
determining, by the computer, whether each variable specified in the data model corresponds to particular business logic in the logic file; and
in response to determining that at least one variable specified in the data model does not correspond to the particular business logic in the logic file, outputting, by the computer, an error message.

13. The computer-implemented method of claim 1, wherein the web application further includes a page router, n-tier web business logic, and web data stores.

14. A computer system, comprising:
a processor;
a memory communicatively coupled to the processor; and
a program module which executes in the processor from the memory and which, when executed by the processor, causes the computer system to covert a desktop application to a web application by
generating an interface file from a user interface of the desktop application,
extracting business logic from application executables of the desktop application,
generating a logic file from the extracted business logic, the logic file comprising specification of the extracted business logic,
generating a data model from application data and states of the desktop application,
determining whether one or more variables specified in the data model corresponds to business logic in the logic file,
in response to determining that at least one variable specified in the data model does not correspond to the business logic in the logic file, outputting, an error message, and
generating the web application from the interface file, the logic file, and the data model, the web application comprising a web interface, a page router, n-tier web business logic, and web data stores.

15. The computer system of claim 14, wherein generating the web application based on the interface file, the logic file, and the data model comprises:
generating the web interface based on the interface file;
generating the page router and the n-tier web business logic based on the logic file; and
allocating the web data stores based on the data model.

16. The computer system of claim 14, wherein the interface file specifies interface elements in the desktop application;
wherein the logic file specifies the business logic in the desktop application and mappings between the business logic and various states of the user interface; and
wherein the data model specifies variable types for data that is stored and retrieved by the desktop application and user states that persist across multiple sessions of the desktop application.

17. The computer system of claim 14, wherein the web interface comprises Hypertext Markup Language (HTML) code that mimics a look and feel of the user interface.

18. The computer system of claim 14, wherein the page router maps each of a plurality of uniform resource locators (URLs) of web pages contained in the web interface to particular business logic defined by the n-tier web business logic.

19. The computer system of claim 14, wherein the program module generates the interface file, the logic file, and the data model via a combination of code analysis of program code associated with the desktop application and runtime analysis of runtime processes during execution of the desktop application.

20. A computer-readable storage medium comprising at least one of an optical disk, a magnetic storage device, or a solid state storage device having computer-executable instructions stored thereon which, when executed by a computer, cause the computer to:
generate, by the computer, an interface file from a user interface of a desktop application, the interface file specifying interface components in the desktop application;
extract, by the computer, business logic from application executables of the desktop application;
generate, by the computer, a logic file from the extracted business logic, the logic file specifying the extracted business logic and mappings between the extracted business logic and various states of the user interface;
generate, by the computer, a data model from application data and states of the desktop application, the data model specifying variable types for data that is stored and retrieved by the desktop application and user states that persist across multiple sessions of the desktop application;
determine, by the computer, whether one or more variables specified in the data model corresponds to business logic in the logic file;

in response to determining that at least one variable specified in the data model does not correspond to the business logic in the logic file, output, by the computer, an error message;
generate, by the computer, a web interface of a web application from the interface file;
generate, by the computer, a page router and n-tier web business logic of the web application from the logic file; and
allocate, through the computer, web data stores of the web application from the data model.

21. A computer system, comprising:
a processor;
a memory communicatively coupled to the processor; and
a program module which executes in the processor from the memory and which, when executed by the processor, causes the computer system to covert a desktop application to a web application by
generating an interface file based on a user interface of the desktop application,
generating a logic file based on application executables of the desktop application,
generating a data model based on application data and states of the desktop application,
determining whether each variable specified in the data model corresponds to particular business logic in the logic file,
in response to determining that at least one variable specified in the data model does not correspond to the particular business logic in the logic file, outputting an error message, and
generating the web application based on the interface file, the logic file, and the data model, the web application comprising a web interface, a page router, n-tier web business logic, and web data stores.

22. A computer-readable storage medium comprising at least one of an optical disk, a magnetic storage device, or a solid state storage device having computer-executable instructions stored thereon which, when executed by a computer, cause the computer to:
generate, by the computer, an interface file based on a user interface of a desktop application, the interface file specifying interface components in the desktop application;
generate, by the computer, a logic file based on application executables of the desktop application, the logic file specifying business logic in the desktop application and mappings between the business logic and various states of the user interface;
generate, by the computer, a data model based on application data and states of the desktop application, the data model specifying variable types for data that is stored and retrieved by the desktop application and user states that persist across multiple sessions of the desktop application;
determine, by the computer, whether each variable specified in the data model corresponds to particular business logic in the logic file,
in response to determination that at least one variable specified in the data model does not correspond to the particular business logic in the logic file, output, by the computer, an error message
generate, by the computer, a web interface of a web application based on the interface file;
generate, by the computer, a page router and n-tier web business logic of the web application based on the logic file; and
allocate, by the computer, web data stores of the web application based on the data model.

23. The computer system of claim 14, wherein generating the interface file comprises:
receiving snapshots of the user interface, the snapshots comprising screen captures of the user interface in various states;
analyzing the snapshots to determine interface elements in the user interface; and
generating the interface file specifying the interface elements.

24. The computer system of claim 14, wherein generating the logic file comprises:
receiving program code associated with the desktop application;
analyzing the program code to extract the business logic and various states of the user interface; and
generating the logic file specifying the business logic and the mappings between the business logic and various states of the user interface.

25. The computer system of claim 24, wherein the program code comprises a high-level language representation, an assembly language representation, or a machine language representation of the desktop application.

26. The computer system of claim 14, wherein generating the logic file comprises:
executing the desktop application to effectuate runtime processes of the desktop application;
analyzing the runtime processes during the execution of the desktop application to extract mappings between the business logic and various states of the user interface; and
generating the logic file specifying the business logic and the mappings between the business logic and various states of the user interface.

27. The computer system of claim 26, wherein the program module is further configured to:
verify code coverage during the execution of the desktop application; and
terminate the execution of the desktop application when the code coverage reaches a minimum code coverage threshold.

28. The computer system of claim 14, wherein generating the data model comprises:
receiving program code associated with the desktop application;
analyzing the program code to determine variable types for data that is stored and retrieved by the desktop application and user states that persist across multiple sessions of the desktop application; and
generating the data model specifying the variable types for data that is stored and retrieved by the desktop application and the user states that persist across multiple sessions of the desktop application.

29. The computer system of claim 14, wherein generating the data model comprises:
executing the desktop application to effectuate runtime processes of the desktop application;
analyzing the runtime processes during the execution of the desktop application to determine variable types for data that is stored and retrieved by the desktop application and user states that persist across multiple sessions of the desktop application; and
generating the data model specifying the variable types for data that is stored and retrieved by the desktop application and the user states that persist across multiple sessions of the desktop application.

30. The computer system of claim 29, wherein generating the web application further comprises:

allocating web data stores having a database structure based on the data model.

* * * * *